March 21, 1967 E. F. ENGLER 3,309,973
LIGHT BLOCKING TOOL FOR PHOTOGRAPHIC PRINTING
Filed Oct. 26, 1964 2 Sheets-Sheet 1

Ernest F. Engler
INVENTOR.

BY *Clarence A. O'Brien*
*and Harvey B. Jacobson*
Attorneys

March 21, 1967     E. F. ENGLER     3,309,973

LIGHT BLOCKING TOOL FOR PHOTOGRAPHIC PRINTING

Filed Oct. 26, 1964     2 Sheets-Sheet 2

Ernest F. Engler
INVENTOR.

BY Clarence A. O'Brien
and Harvey B. Jacobson
Attorneys

United States Patent Office 3,309,973
Patented Mar. 21, 1967

3,309,973
LIGHT BLOCKING TOOL FOR PHOTOGRAPHIC PRINTING
Ernest F. Engler, 110 N. Wilson St.,
Casper, Wyo. 82601
Filed Oct. 26, 1964, Ser. No. 406,528
16 Claims. (Cl. 95—1)

This invention relates to a photofinishing tool and its use.

The present invention is particularly concerned with photographic printing wherein certain areas of a photographic image are to be printed darker or lighter than normal. Accordingly, a portion of the light impinging on the photo-sensitive area during the exposure period, must be dodged or blocked. The blocking or dodging of a portion of the light is achieved in accordance with the present invention by use of a novel tool placed in the optical path of the image projected during the exposure period.

It is therefore a primary object of the present invention to provide a tool capable of being utilized for photographic dodging purposes in a more accurate and facile manner.

An additional object of the present invention is to provide a photographic dodging tool designed to effect dodging of the photographic image throughout the printing exposure period so as to eliminate the need for precise timing which is critical when dodging during short exposure periods.

A further object of the present invention is to provide a photofinishing tool for partially rather than completely blocking or dodging light over a predetermined area of the image throughout the printing exposure period so as to more accurately dodge the photographic picture and avoid abrupt density variations on the picture area as compared to results obtained with light dodging tools that are completely opaque.

A still further object of the present invention is to provide a light dodging tool capable of being utilized to variably block light between limits established by the thickness, spacing, angle and height of fixedly spaced divider or shutter portions of the tool between which light passes. A variation in the amount of light blockage between the limits so established, will be dependent upon the angular position and spacing of the tool from the light source. Also, distribution of the light through the tool will be prescribed by the peripheral shape of the tool and the variation in height of the divider strip portions of the tool.

Yet another object of the present invention is to provide a light blocking tool for dodging photographs during the printing exposure period, wherein the tool is provided with a spiral shaped handle operative to eliminate line shadows on the picture area being dodged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
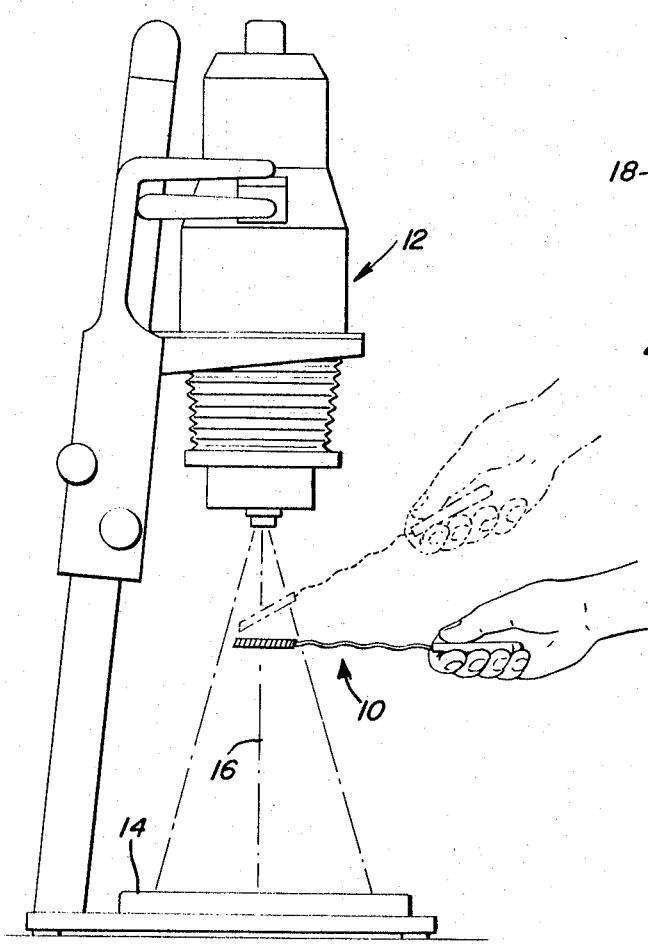
FIGURE 1 is a side elevational view illustrating the light blocking tool of the present invention while in use.

Referring initially to FIGURE 1, it will be observed that the light blocking tool generally referred to by reference numeral 10 is adapted to be held in the hand of the user and placed in the optical path of a photographic image being projected by the enlarger 12 onto a photo-sensitive surface 14 during a predetermined printing exposure period. In this manner, a certain amount of light impinging on the surface 14 will be blocked so that a portion of the picture area will be rendered darker. The amount of light so blocked by the tool 10 and the distribution of the light passing through the tool will be determined by the spacing of the tool from the source of light along the optical axis 16 and the angle at which it is positioned during the exposure period. For example, the tool 10 illustrated in FIGURE 1 when held in a position at right angles to the optical axis 16 as shown by solid line, will block approximately 90% of the light which would otherwise pass through the area occupied by the tool whereas 30% of the light would be blocked when the tool is positioned as indicated by dotted line in FIGURE 1 at another angle.

Figure 2:
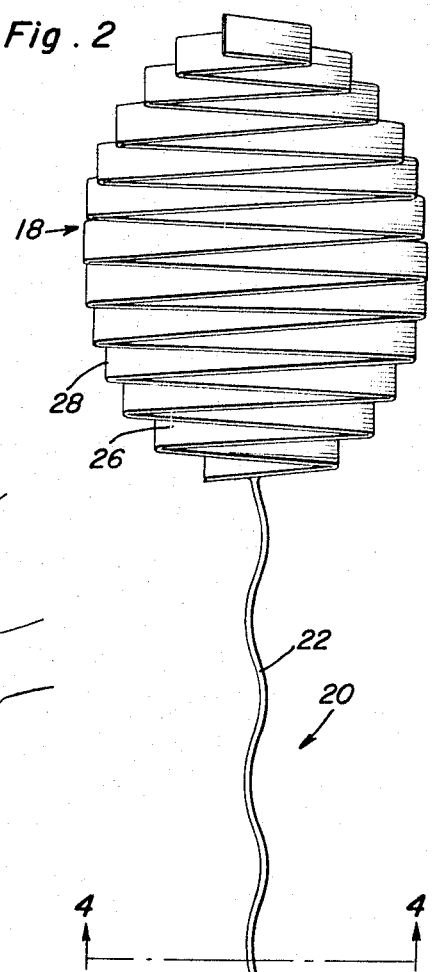
FIGURE 2 is a top plan view of one form of tool constructed in accordance with the present invention.
Figure 3:
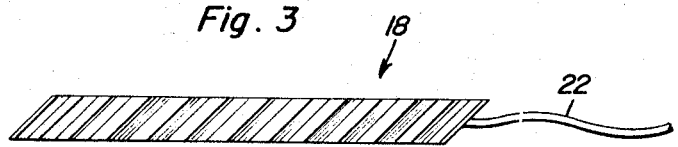
FIGURE 3 is a partial side elevational view of the tool shown in FIGURE 2.
Figure 4:
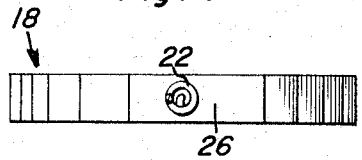
FIGURE 4 is a transverse sectional view taken substantially through a plane indicated by section line 4—4 in FIGURE 2.

One form of tool is shown in FIGURES 2, 3 and 4. Although variations in the construction of the tool will be described, they all have in common a light blocking portion generally referred to by reference numeral 18 in FIGURES 2 through 4 and a handle portion generally referred to by reference numeral 20. The handle portion includes an elongated rod-like member 22 formed in the shape of a spiral about a longitudinal axis. The rear end of the rod member 22 is connected to any suitable handle grip 24 while the forward end is connected to the light blocking portion 18 of the tool.

The light blocking portion of the tool is formed from a continuous, rigid strip of material 26 folded in zig-zag fashion so as to extend symmetrically from opposite sides of the longitudinal axis associated with the handle portion in a transverse plane as shown in FIGURE 2 for example. The folded strip of material thereby forms divider strip or shutter portions 28 fixedly spaced along the longitudinal axis and at an angle to the transverse plane so that light may pass therebetween.

Figure 10:
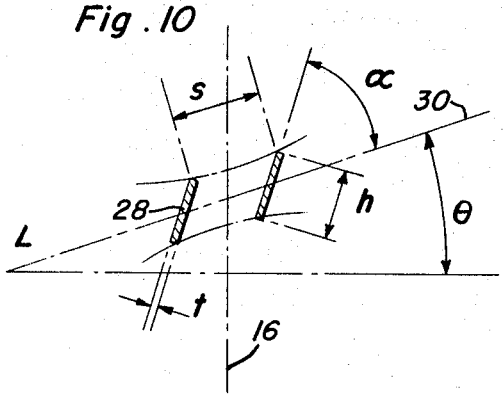
FIGURE 10 is a diagrammatic view illustrating certain geometrical relationships associated with the light blocking tools of the present invention.

Referring now to FIGURE 10, it will be observed that the amount of light passing between the divider strip portions 28 will depend upon several factors including the angular position of the tool in relation to the optical axis 16, the height or width of the strip portions $h$, the angle $\alpha$ of the strip portions to the longitudinal axis 30 in the transverse plane of the tool, the thickness of the strip portions $t$ and the spacing $s$ between the strip portions. The distribution of the light passing between the divider strip portions 28, will also depend upon the peripheral outline of the tool and the variation in height $h$ of the divider strip portions. In all cases, however, the spacing $s$ between the strip portions 28 along the longitudinal axis 30 will be equal and the portions 28 will be disposed in parallel relation to each other. It will therefore be apparent, that the angular position $\theta$ of the tool will determine the extent to which the tool blocks the passage of light between limits established by the aforementioned dimensional factors associated with each of the tools. These dimensional factors are of course varied in the construction of any given tool so as to meet different requirements of the user. In the tool illustrated in FIGURES 2 through 4, the peripheral outline in the transverse plane intersected at spaced locations by the folds between the divider strip portions is in the shape of an oval while the height $h$ of the strip portions is constant.

Figure 5:
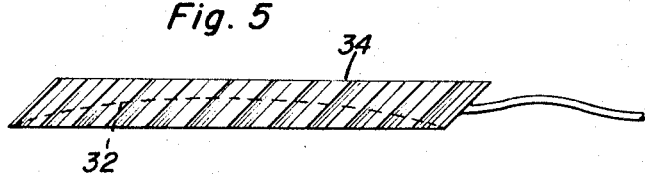
FIGURE 5 is a partial side elevational view of another form of tool constructed in accordance with the present invention.
Figure 5A:
FIGURE 5a is a partial side elevational view of another variation in the construction of the tool of the present invention.
Figure 6:
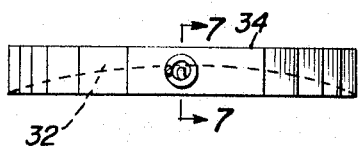
FIGURE 6 is a rear end view of the tool similar to the view shown in FIGURE 4 but corresponding to the modified form of tool shown in FIGURE 5.
Figure 6A:
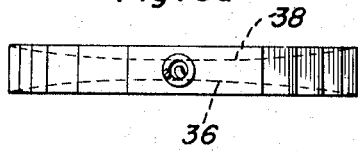
FIGURES 6a and 6b are rear end views of other variations in the construction of the tool.
Figure 6B:
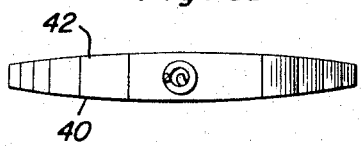
Figure 7:
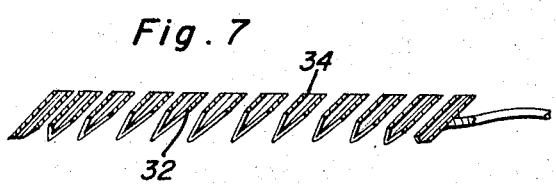
FIGURE 7 is a sectional view taken substantially through a plane indicated by section line 7—7 in FIGURE 6.
Figure 8:
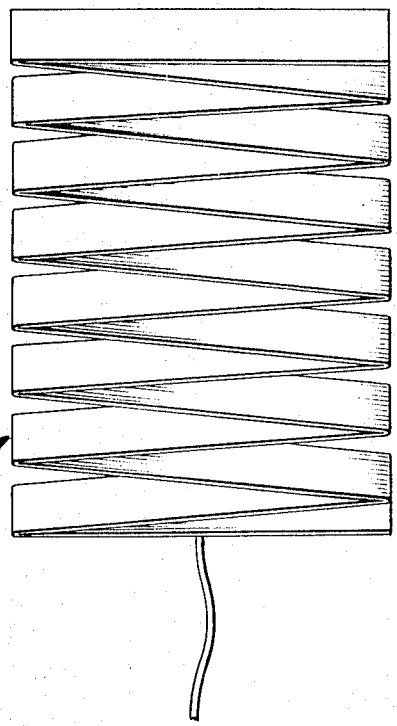
FIGURE 8 is a partial top plan view of yet another structural variation in the tool.
Figure 9:
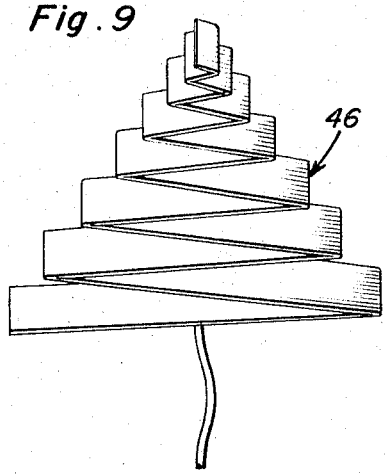
FIGURE 9 is a partial top plan view of another structural variation in the tool.

FIGURES 5, 6 and 7 illustrate a modification of the tool shown in FIGURES 2 through 4 whereby the height or width of the divider strip portions are varied. Accordingly, the lower side 32 of the light blocking portion of the tool shown in FIGURES 5 through 7, has a convex curvature so that the central portion of the light blocking portion will be provided with divider strip portions of minimum width or height. The upper side 34 of the light blocking portion of the tool on the other hand, forms a plane parallel to the transverse plane of the tool. The lower side 5 of the tool could alternatively have a concave curvature 35 as shown in FIGURE 5a. Both the upper and lower sides may be formed as convex curvatures as shown by sides 36 and 38 in FIGURE 6a. Concave curvatures could also form the upper and lower sides of the light blocking portion of the tool as shown by the sides 40 and 42 in FIGURE 6b. Thus, the lower and upper sides of the light blocking portion of the tool may be made in accordance with a desired curvature in order to prescribe the variation in the height of the divider strip portions in order to meet any desired light distribution and light blockage variation requirements. Light distribution and the portion of the picture area to be dodged will also be prescribed by the discontinuous peripheral outline of the light blocking portion of the tool. Accordingly, in lieu of an oval outline such as shown in FIGURE 2, a rectangular outline may be formed by the modified light blocking portion 44 shown in FIGURE 8. A triangular outline may also be formed as shown by the light blocking portion 46 of the tool in FIGURE 9. It should of course be appreciated, that the several variations described may be interchanged and used in different combinations when constructing any particular tool.

From the foregoing description, the construction and utility of the light blocking tools of the present invention will be apparent. These tools are designed to be positioned in the path of the projected image during the whole printing exposure period instead of blocking all of the light from the dodged area for a portion of the exposure period as in the case of opaque dodging tools. Greater accuracy in dodging photographs is thereby made possible in connection with very short exposure times. Even light blockage over the dodged area is also made possible because of the controlled distribution of the light. Extreme density changes in the printed picture between the dodged areas and the undodged areas will also be avoided because there are no continuous peripheral or outline edges associated with the light blocking portion as in the case of an opaque light blocking tool. Also, the use of the spiral rod handle member will prevent the development of sharp lines because of line shadows. The tool could be useful in connection with all negative, black and white or color as well as positive printing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool for dodging a photographic image projected onto a photo-sensitive surface during a predetermined exposure period comprising, a light blocking portion and a handle portion, said handle portion including an elongated spiral rod member having a longitudinal axis, said light blocking portion being connected to one end of the handle portion and including a continuous rigid strip of material folded into divider sections extending symmetrically from opposite sides of said longitudinal axis in a transverse plane, said divider sections being spaced along said longitudinal axis at an angle to said transverse plane for passage of light therebetween.

2. The combination of claim 1 wherein said divider sections are equally spaced along said longitudinal axis in parallel relation to each other rearwardly inclined toward the handle portion at said angle to the transverse plane.

3. The combination of claim 2 wherein said divider sections form a peripheral outline in said transverse plane, said strip of material varying in width to define a curvature on at least one side of the transverse plane.

4. The combination of claim 3 wherein said peripheral outline is an oval.

5. The combination of claim 4 wherein said curvature is concave.

6. The combination of claim 1 wherein said divider sections form a peripheral outline in said transverse plane, said strip of material varying in width to define a curvature on at least one side of the transverse plane.

7. The combination of claim 6 wherein said curvature is convex.

8. A tool for dodging a photographic image projected onto a photo-sensitive surface during a predetermined exposure period comprising, a light blocking portion and a handle portion having a longitudinal axis, said light blocking portion being connected to one end of the handle portion and including a continuous rigid strip of material folded into divider sections extending symmetrically from opposite sides of said longitudinal axis in a transverse plane, said divider sections being equally spaced along said longitudinal axis in parallel relation to each other rearwardly inclined toward the handle portion at an angle to the transverse plane.

9. The combination of claim 8 wherein said divider sections form a peripheral outline in said transverse plane, said strip of material varying in width to define a curvature on at least one side of the transverse plane.

10. The combination of claim 9 wherein said peripheral outline is a rectangle.

11. The combination of claim 8 wherein the divider sections peripherally define a triangle in said transverse plane.

12. A method of dodging a photographic image projected for a predetermined exposure period onto a photosensitive surface by use of a tool having fixedly spaced divider strip portions disposed at an angle to a tool positioning axis, including the step of: holding the tool within the optical path of the projected image throughout said exposure period, said tool positioning axis being held at an angle to the optical axis for blocking a desired amount of light between limits established by the angle, spacing, thicknesss and width of said divider strip portions, said angle and width of the divider strip portions prescribing the distribution of light on the portion of the image being dodged, said dodged portion of the image being determined by the peripheral outline of the tool.

13. A tool for dodging a photographic image projected onto a photosensitive surface, comprising a light blocking member having a discontinuous outline about a predetermined area and means for positioning said light blocking member in a plane spaced from said surface, said light blocking member including spaced shutter portions partially blocking said light projected through said plane onto said surface and means interconnecting said shutter portions at spaced locations along said discontinuous outline bounding the predetermined area in said plane, said shutter portions being disposed at an angle to said plane.

14. The combination of claim 13 wherein said shutter portions and interconnecting means form a continuous, folded strip.

15. A tool for dodging a photographic image projected onto a photosensitive surface, comprising a light blocking member having a discontinuous outline about a predetermined area and means for positioning said light blocking member in a plane spaced from said surface, said light blocking member including spaced shutter portions partially blocking said light projected through said plane onto said surface and means interconnecting said shutter portions at spaced locations along said discontinuous outline bounding the predetermined area in said plane, said shutter portions and interconnecting means forming a continuous, folded strip.

16. A method of dodging a predetermined area of a photographic image projected onto a photosensitive surface utilizing a light blocking tool having spaced shutter portions disposed at an angle to a tool positioning axis, comprising the steps of: holding the tool within the path of light projecting said image along an optical axis; and adjusting the angle of said positioning axis relative to the optical axis to vary the amount of light passing between said shutter portions onto said predetermined area on the surface.

References Cited by the Examiner

UNITED STATES PATENTS

| 7,865 | 1/1859 | Anthony | 95—79 |
| 3,019,702 | 2/1962 | Winn | 88—24 |

OTHER REFERENCES

"The Encyclopedia of Photography," 1949, published by National Educational Alliance Inc., New York, vol. 4, p. 1512.

Book, "Complete Photographer," by Bayley, 2nd ed., 1907, p. 302.

JOHN M. HORAN, *Primary Examiner.*